(12) United States Patent
Marks, Jr.

(10) Patent No.: US 7,217,044 B1
(45) Date of Patent: May 15, 2007

(54) CAMERA SYSTEM

(75) Inventor: Franklin J. Marks, Jr., Howard, PA (US)

(73) Assignee: Wintron Technologies Inc., Howard, PA (US)

( * ) Notice: Subject to any disclaimer, the term of this patent is extended or adjusted under 35 U.S.C. 154(b) by 965 days.

(21) Appl. No.: 10/065,748

(22) Filed: Nov. 14, 2002

Related U.S. Application Data

(60) Provisional application No. 60/357,933, filed on Feb. 19, 2002, provisional application No. 60/356,182, filed on Feb. 12, 2002, provisional application No. 60/336,374, filed on Nov. 15, 2001.

(51) Int. Cl.
*G03B 17/00* (2006.01)
*H04N 5/225* (2006.01)

(52) U.S. Cl. ............... 396/420; 396/428; 348/376

(58) Field of Classification Search ............... 396/419, 396/420, 424, 427, 428; 352/243; 348/373–376, 348/82, 148; 224/908

See application file for complete search history.

(56) References Cited

U.S. PATENT DOCUMENTS 6,056,450 A * 5/2000 Walling ................ 396/428

* cited by examiner

*Primary Examiner*—W. B. Perkey
*Assistant Examiner*—Rishi S. Suthar
(74) *Attorney, Agent, or Firm*—John J. Elnitski, Jr.

(57) ABSTRACT

A camera system having a pole, camera mount assembly and an actuator. The camera mount assembly mounts to the pole and includes a pole base, camera base, link, tendon and spring. The pole base connects to the pole and the camera base connects to the camera. The link connects the pole base and the camera base and allows rotation of the camera base. The tendon pulls on the camera base and rotates the camera base about the pole base. The spring interconnects the pole base and the camera base. The spring also acts as a return. The spring stretches when the tendon pulls on the camera base and recoils to pull the camera base back to an original position when the tendon is released from pulling on the camera base. The actuator mounts to an actuator end of the pole and is used pull the tendon in order to move the camera.

22 Claims, 15 Drawing Sheets

CAMERA SYSTEM

CROSS REFERENCE TO RELATED APPLICATIONS

This application claims the benefit of and incorporates by reference U.S. Provisional Application Nos.: 60/336,374 filed Nov. 15, 2001, 60/356,182 filed Feb. 12, 2002 and 60/357,933 filed Feb. 19, 2002.

BACKGROUND OF INVENTION

The present invention generally relates to camera systems used for looking into rubble of a disaster area and other hard to reach places which are not easily accessed by humans. More specifically, the present invention relates to a camera system with a telescopic pole and camera actuator to aid in looking in areas not easily accessed by humans.

There are many different types of camera systems which are available to look through rubble of a disaster area. Most of these devices lack ease of use when trying to move a camera support through the rubble, while at the same time allowing the user to manipulate the camera in other directions in order to obtain an accurate view of what is covered by the rubble.

It is an object of the present invention to provide a camera support and actuator that allows the user to easily rotate a camera while moving the camera support pass an object.

SUMMARY OF INVENTION

A camera system having a pole, camera mount assembly and an actuator. The camera mount assembly mounts to the pole and includes a pole base, camera base, link, tendon and spring. The pole base connects to the pole and the camera base connects to the camera. The link connects the pole base and the camera base and allows rotation of the camera base. The tendon pulls on the camera base and rotates the camera base about the pole base. The spring interconnects the pole base and the camera base. The spring also acts as a return. The spring stretches when the tendon pulls on the camera base and recoils to pull the camera base back to an original position when the tendon is released from pulling on the camera base. The actuator mounts to an actuator end of the pole and is used pull the tendon in order to move the camera.

DETAILED DESCRIPTION

Figure 1:
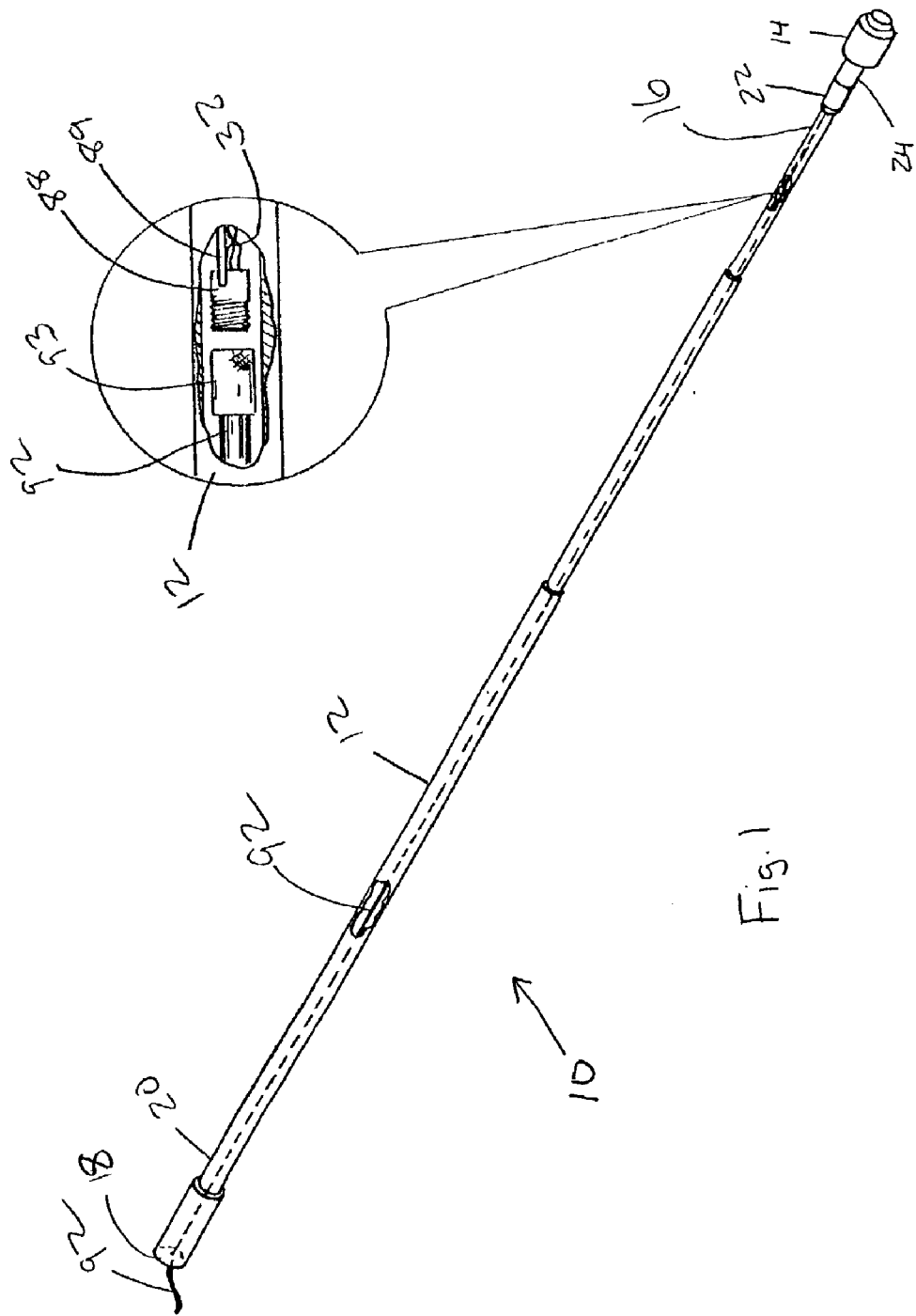
FIG. 1 is a perspective view of a camera system according to the present invention.

The present invention is a camera system 10. The camera system 10 includes a telescopic pole 12 and a camera 14, as shown in FIG. 1. The camera 14 is mounted on a camera end 16 of the telescopic pole 12. The telescopic pole 12 includes an actuator 18 mounted on an actuator end 20 of the telescopic pole 12, which is controlled by the user. The camera system 10 is especially useful to search in debris and rubble for victims of catastrophes, such as earthquakes or terrorist attacks. The telescopic pole 12 allows placement of the camera 14 into the debris and movement further into the debris by extending the telescopic pole 12. The telescopic pole 12 is hollow to allow a cable of wiring to pass from a display to the camera 14. The actuator 18 is used to manipulate the camera 14 on the telescopic pole 12.

Figure 2:
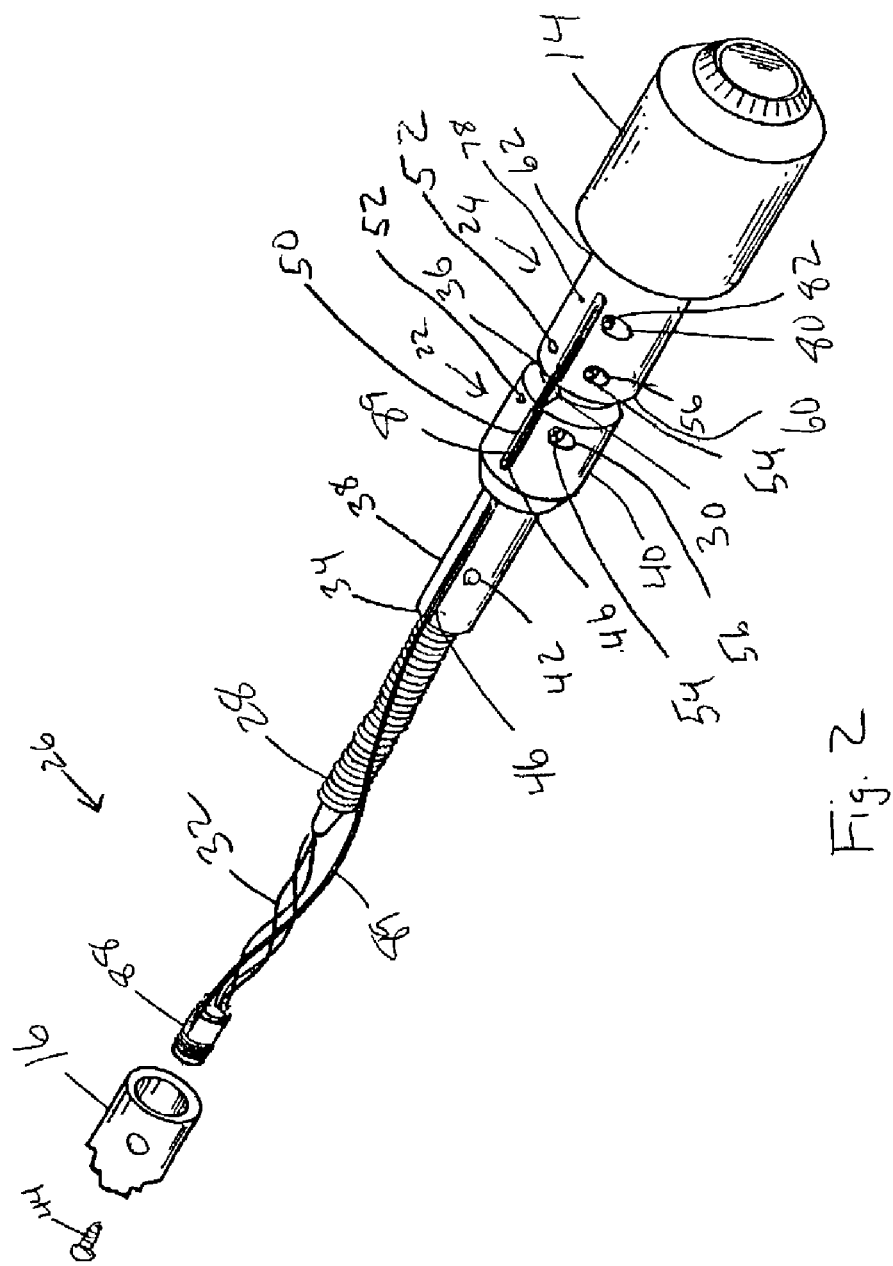
FIG. 2 is a perspective view of a camera mount assembly according to the present invention.
Figure 3:
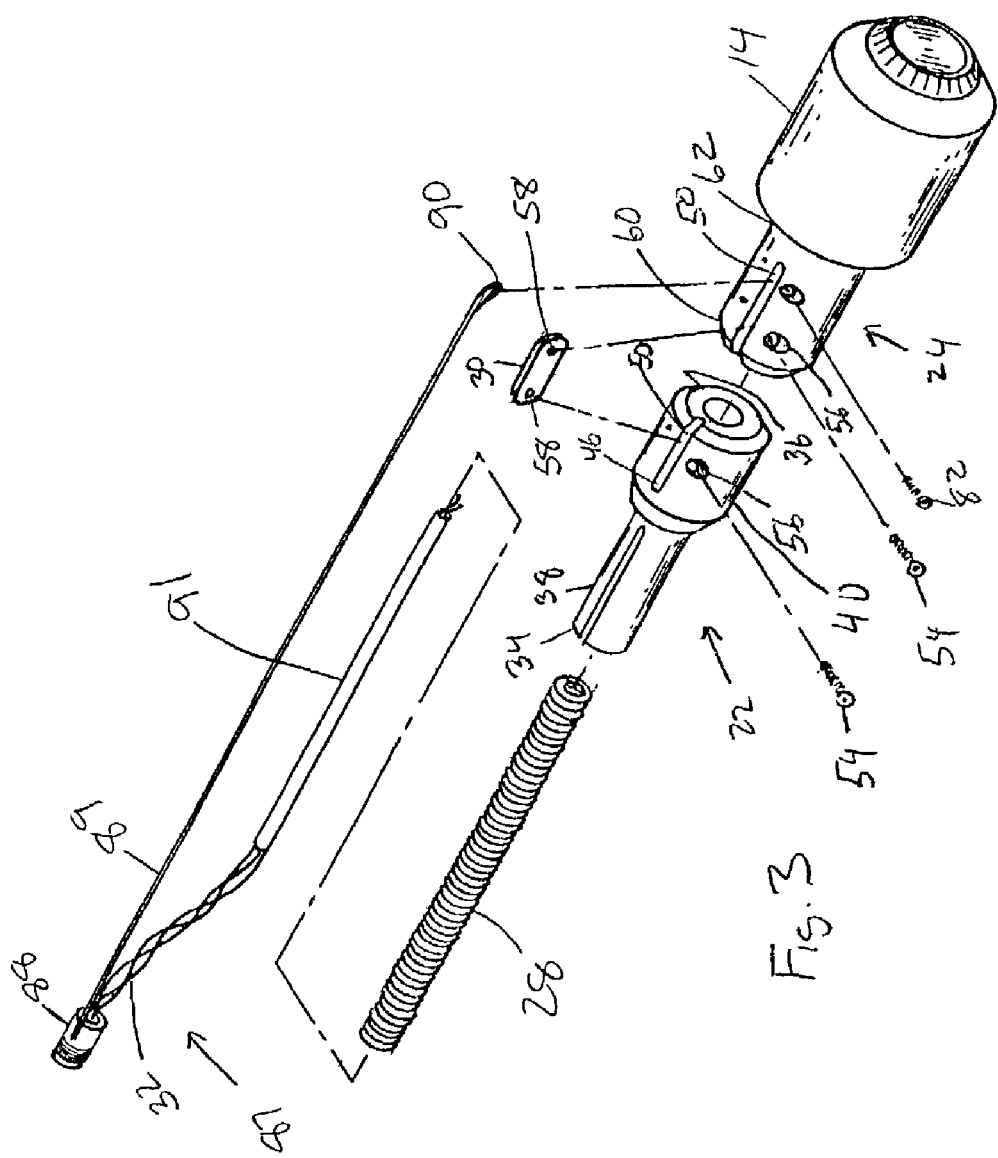
FIG. 3 is an exploded view of a camera mount assembly according to the present invention.
Figure 4:
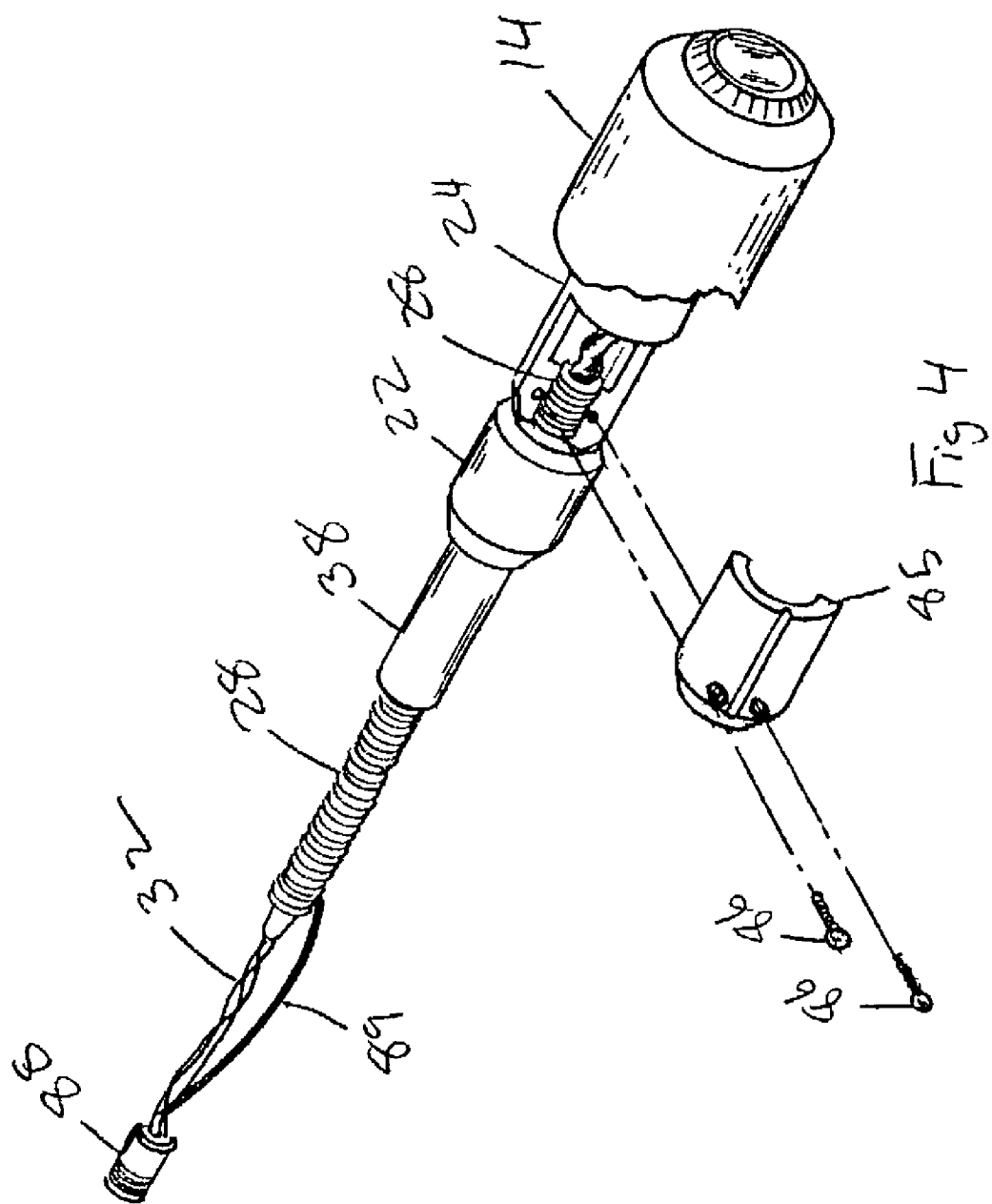
FIG. 4 is a perspective view of a camera mount assembly according to the present invention.
Figure 5:
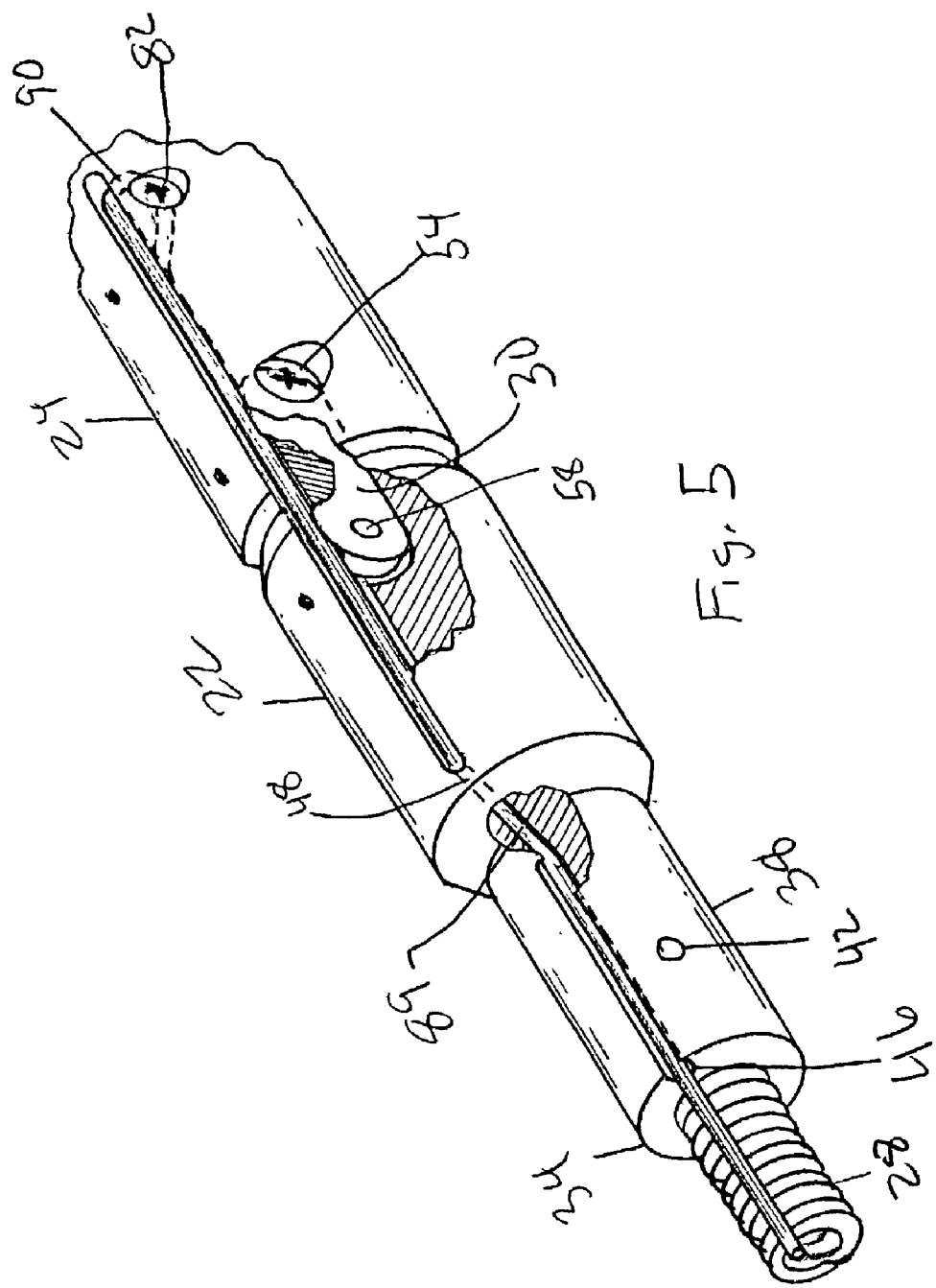
FIG. 5 is a perspective cut-a-way view of a pole base and camera base according to the present invention.

The camera 14 is mounted to a camera mount assembly on the camera end 16 of the telescopic pole 12, as shown in FIG. 2. The camera mount assembly includes a pole base 22, camera base 24, wiring harness 26, spring 28 and link 30, as shown in FIGS. 2–5. The camera base 24 includes the camera 14 attached to the camera base 24. The link 30 and spring 28 interconnects the camera base 24 to the pole base 22. The spring 28, pole base 22 and camera base 24 all include a hollow diameter to allow wiring 32 from the wiring harness 26 to pass onto the camera 14. The pole base 22 mounts to the camera end 16 of the telescopic pole 12. The pole base 22 has a pole end 34 and a link end 36. The pole end 34 includes a hollow shaft 38 projecting from a main body 40 of the pole base 22 and a set screw hole 42 on the hollow shaft 38. The hollow shaft 38 is inserted into an opening in the camera end 16 of the telescopic pole 12. A pole set screw 44 is used to secure the pole base 22 to the telescopic pole 12, as shown in FIG. 2. The hollow shaft 38 and the main body 40 of the pole base 22 each includes a tendon slot 46, which are aligned with each other and connected by a tendon hole 48, as shown in FIG. 5. At the link end 36 of the pole base 22 is a link slot 50 which is aligned with the tendon slot 46 of the main body 40. There is a threaded link screw hole 52 in the link slot 50, which receives a link screw 54 via a non-threaded link screw hole 56 on the outside of the main body 40. The link screw 54 secures one end of the link 30 in the link slot 50. The link 30 includes a non-threaded link screw hole 58 in each end of the link 30. The link 30 is secured in the link slot 50, such that the link 30 can rotate about the link screw 54 in the link slot 50.

Figure 6:
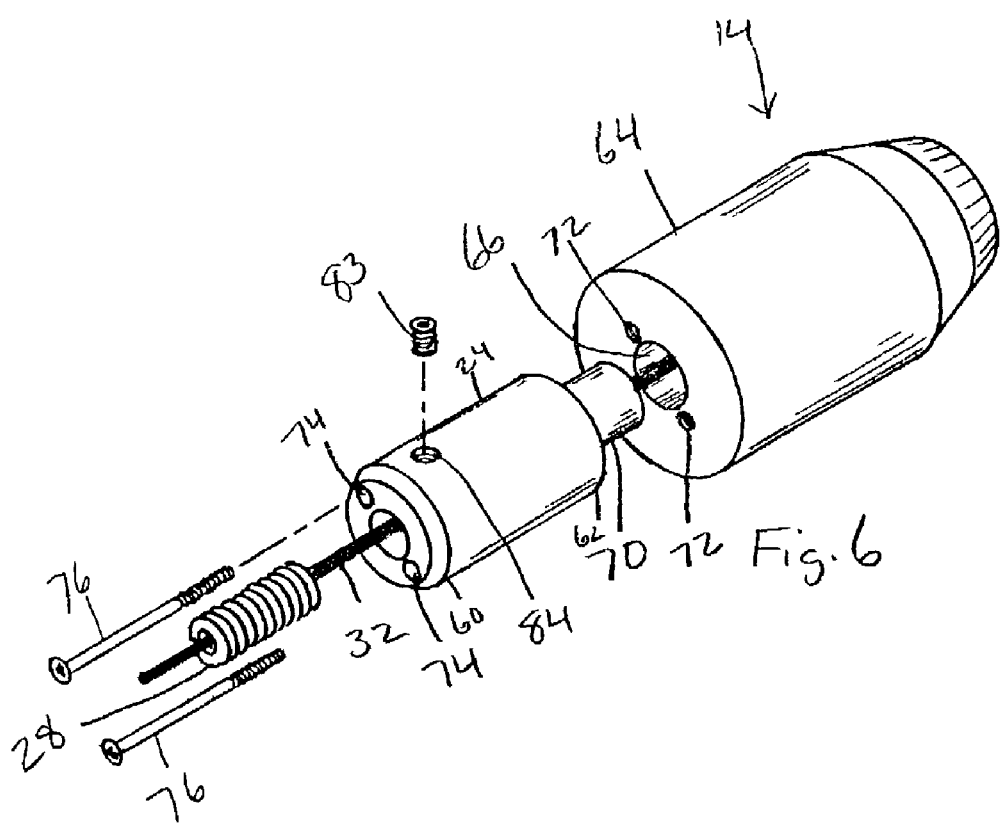
FIG. 6 is an exploded view of a camera base and camera according to the present invention.
Figure 7:
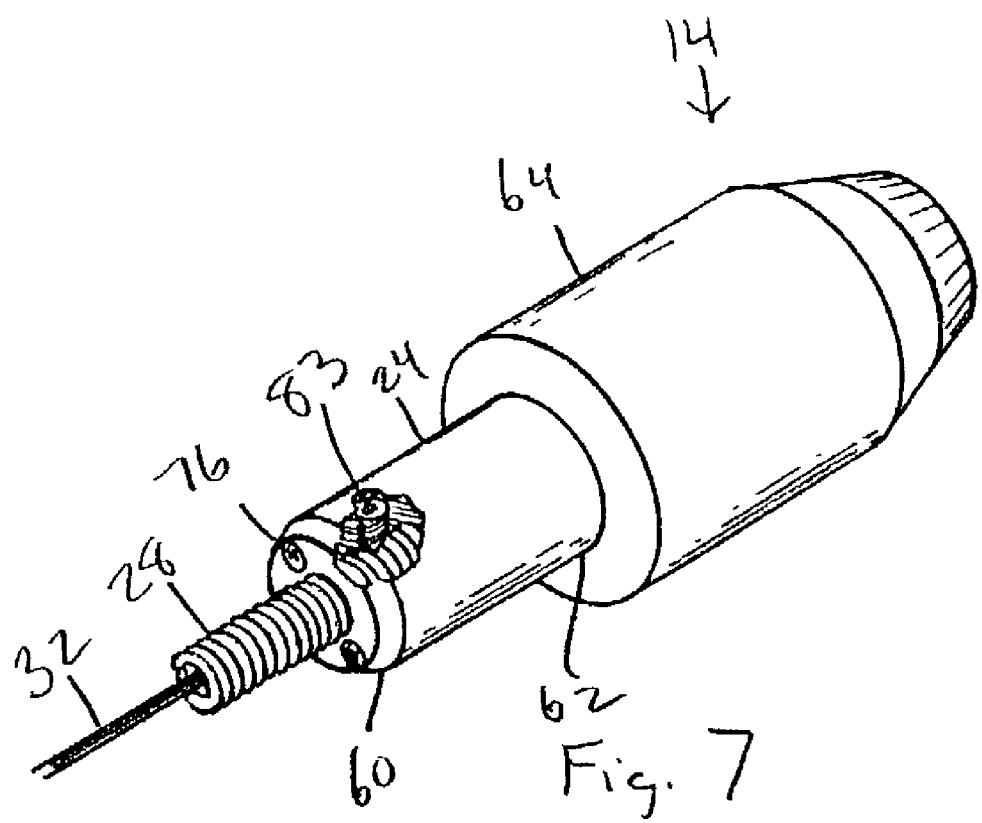
FIG. 7 is a perspective view of a camera base and camera according to the present invention.

The camera base 24 includes a link end 60 and a camera end 62. The camera base 24 is hollow to receive the wiring 32 from wiring harness 26. The camera end 62 of the camera base 24 is mounted to the camera 14. FIGS. 6–7 show an example of how the camera 14 can be attached to the camera end 62 of the camera base 24. In FIGS. 6–7, a camera housing 64 which contains the camera 14 is shown with an opening 66 in the rear 68 of the camera housing 64. The opening 66 in the camera housing 64 receives a stud 70 extending from the camera end 62 of the camera base 24. The rear 68 of the camera housing 64 includes two threaded holes 72 next to the opening 66. The camera base 24 includes two screw holes 74 between the link end 60 and the camera end 62 of the camera base 24. Two screws 76 are used to secure the camera base 24 to the camera housing 64 by inserting the screws 76 into the two screw holes 74 of the camera base 24 and threading the screws 76 into the threaded screw holes 72 of the camera housing 64. The combination of the stud 70 and screws 76 secures the camera housing 64 and camera base 24 together. It is envision there are other ways to attach the camera 14 to the camera base 24, such as make the camera base 24 as part of the camera housing that contains the camera 14.

Figure 14:
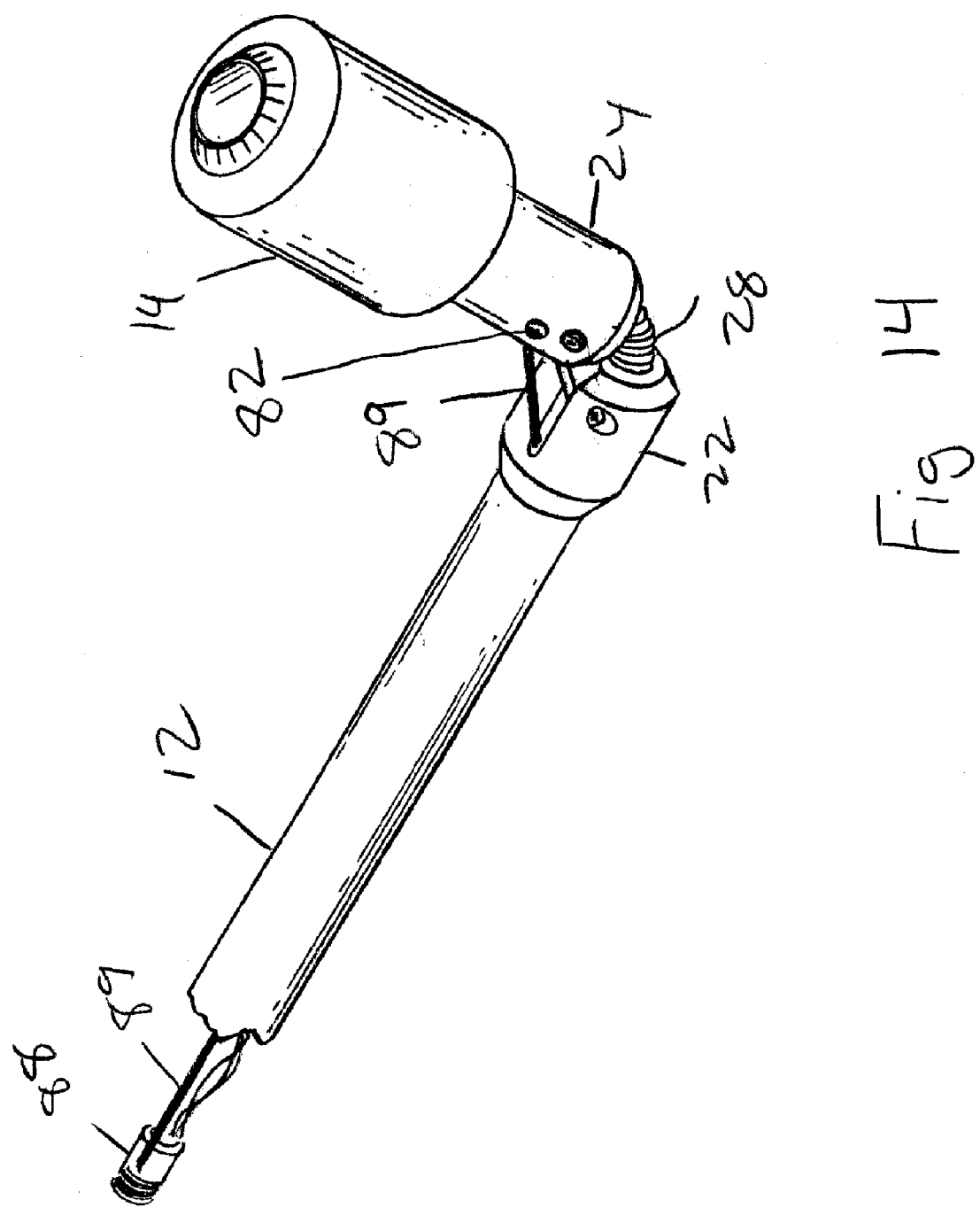
FIG. 14 is a perspective view of partial rotation of the camera according to the present invention.
Figure 15:
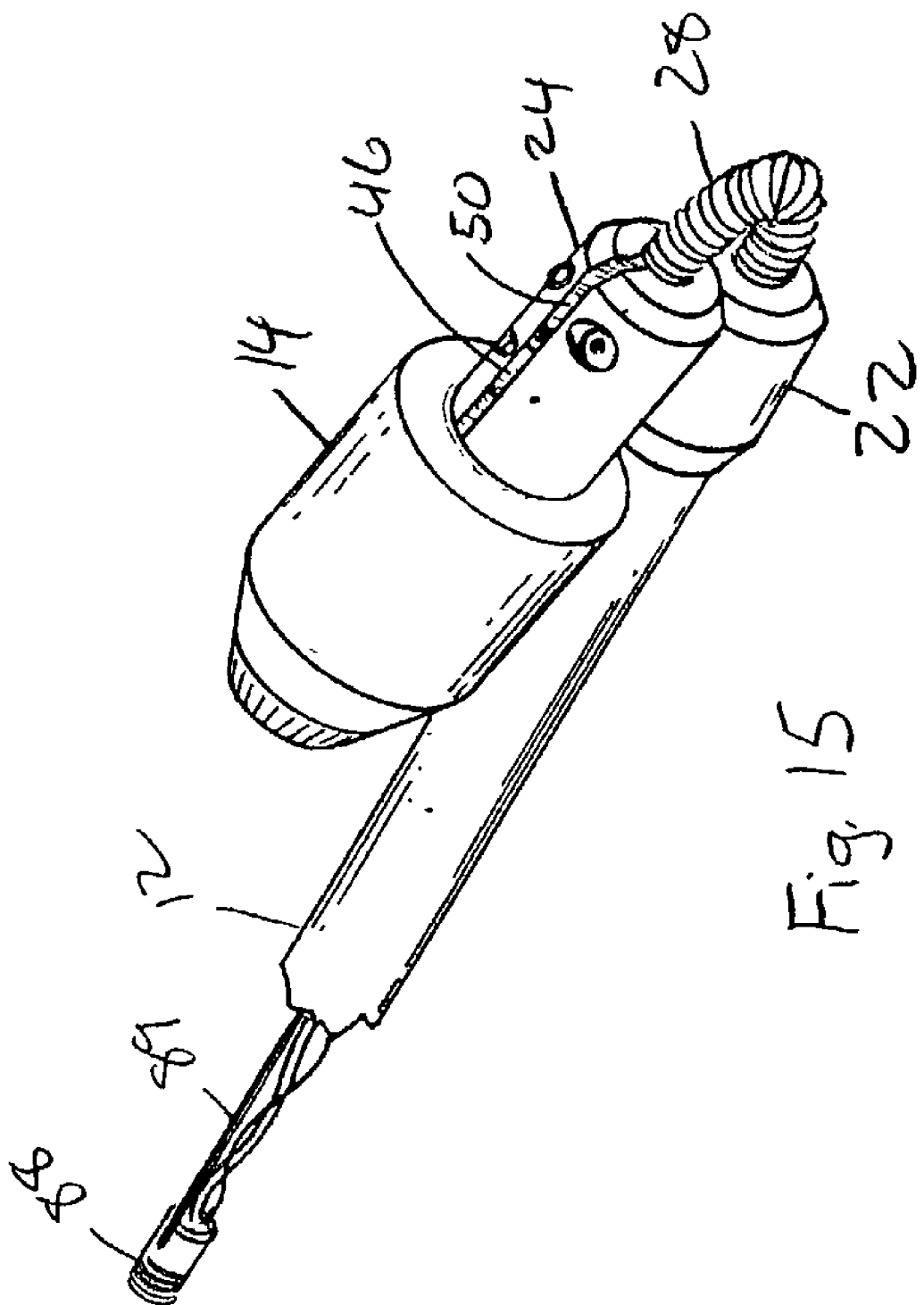
FIG. 15 is a perspective view of full rotation of the camera according to the present invention.

The link end 60 of the camera base 24 includes a tendon slot 46, link slot 50 aligned with the tendon slot 46, threaded link screw hole 52 in the link slot 50, non-threaded link screw hole 56 and link screw 54, which are similar to the link end 36 of the pole base 22. The other end of the link 30 is rotationally secured to the link end 60 of the camera base 24 in the same manner as the pole base 22. Additionally, the link end 60 of the camera base 24 includes a threaded tendon screw hole 78 in the tendon slot 46, non-threaded tendon screw hole 80 on the outside of the camera base 24 and a tendon screw 82. Both the camera and pole bases 24, 22 are chamfered at the link ends 60, 36 to allow full rotation between the bases 24, 22 about the link 30, as shown in FIGS. 2–7 and 14–15. As shown in FIGS. 4, 15 the link slot 50, link screw holes 52, 56, tendon slot 46 and tendon holes 78, 80 can be reproduced on the opposite side of the camera base 24 to allow reversing the mounting position of the camera 14 in relation to the telescopic pole 12. The ability to reverse the mounting of the camera 14 takes into account controlling what positioning orientation will be viewed on a display by a user.

The spring 28 is a coiled spring. The spring 28 is inserted into the hollow diameter of the pole base 22 and the camera base 24 and is secured in the camera base 24. The spring 28 can be secured in the camera base 24 in different ways, as shown by an examples in FIGS. 4, and 6–7. FIGS. 6–7 shows the spring 28 secured by a spring set screw 83 via a spring set screw hole 84. FIG. 4 shows the spring 28 secured by a clamping section 85 of the camera base 24, which clamps the spring 28 in place. The clamping section 85 is secured by two clamping screws 86 screwed into the camera base 24. When the link 30 is secured to the link ends 36, 60 of the pole and camera bases 22, 24 and the spring 28 is inserted into the telescopic pole 12 and bases 22, 24, the camera base 24 is rotatably secured to the pole base 22. The link 30 provides support for the camera 14 and prevents the camera 14 from flopping about on the spring 28.

The wiring harness 87 includes a harness connector 88, wiring 32 extending from the harness connector 88, a tendon cable 89 with a loop 90 extending from the harness connector 88 and a wire jacket section 91. The wiring 32 runs from the harness connector 88, through the spring 28 and is attached to the camera 14. The wire jacket section 91 covers the wiring 32 of the wiring harness 87, which is inside the spring 28 and provides protection of the wiring 32 during movement of the spring 28. The tendon cable 89 runs along the outside of the spring 28 into the tendon slot 46 in the hollow shaft 38 of the pole base 22. The tendon cable 89 continues through the tendon hole 48 and into the tendon slot 46 of the main body 40 of the pole base 22. The loop 90 is secured to the camera base 24 by the tendon screw 82 in the tendon slot 46 of the camera base 24. The harness connector 88 is attached to a mating actuator cable connector 93 mounted on an end of an actuator cable 92 that extends from the actuator end 20 of the telescopic pole 12 to the harness connector 88, as shown in FIG. 1. The actuator cable 92 includes wiring connected from a display or recording device to the actuator cable connector 93. The wiring in the actuator cable 92 is covered by a wiring jacket, which can withstand movement during the use of the actuator cable 92 to control movement of the camera 14. The actuator cable connector 93 and harness connector 88 interconnect the wiring 32 of the wiring harness 87 to the wiring of the actuator cable 92. The wiring 32 of the wiring harness 87 includes enough wiring, such that there is slack between the harness connector 88 and the camera 14.

Figure 11:
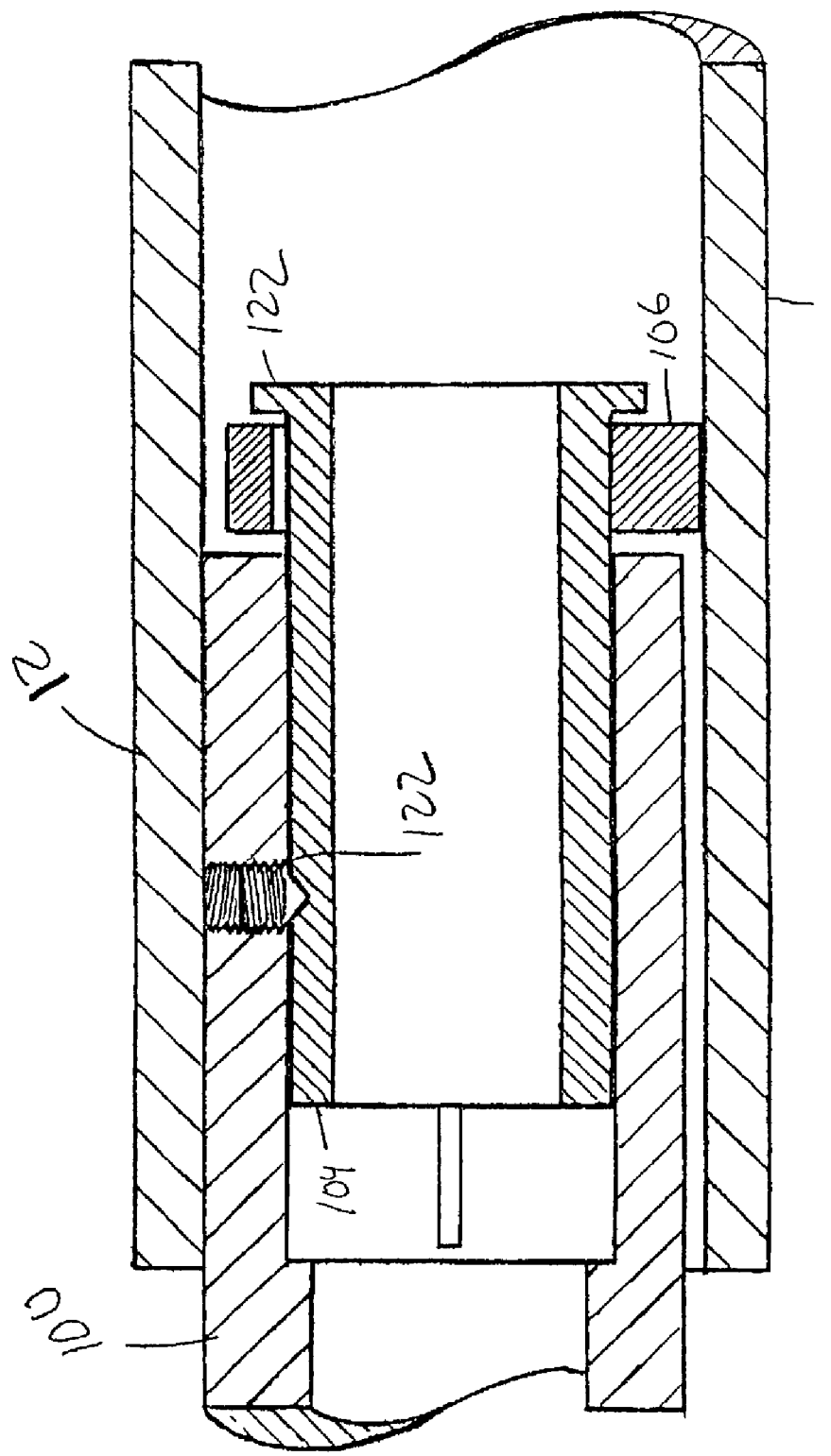
FIG. 11 is a cross-sectional view of an actuator in a pole according to the present invention.
Figure 12:
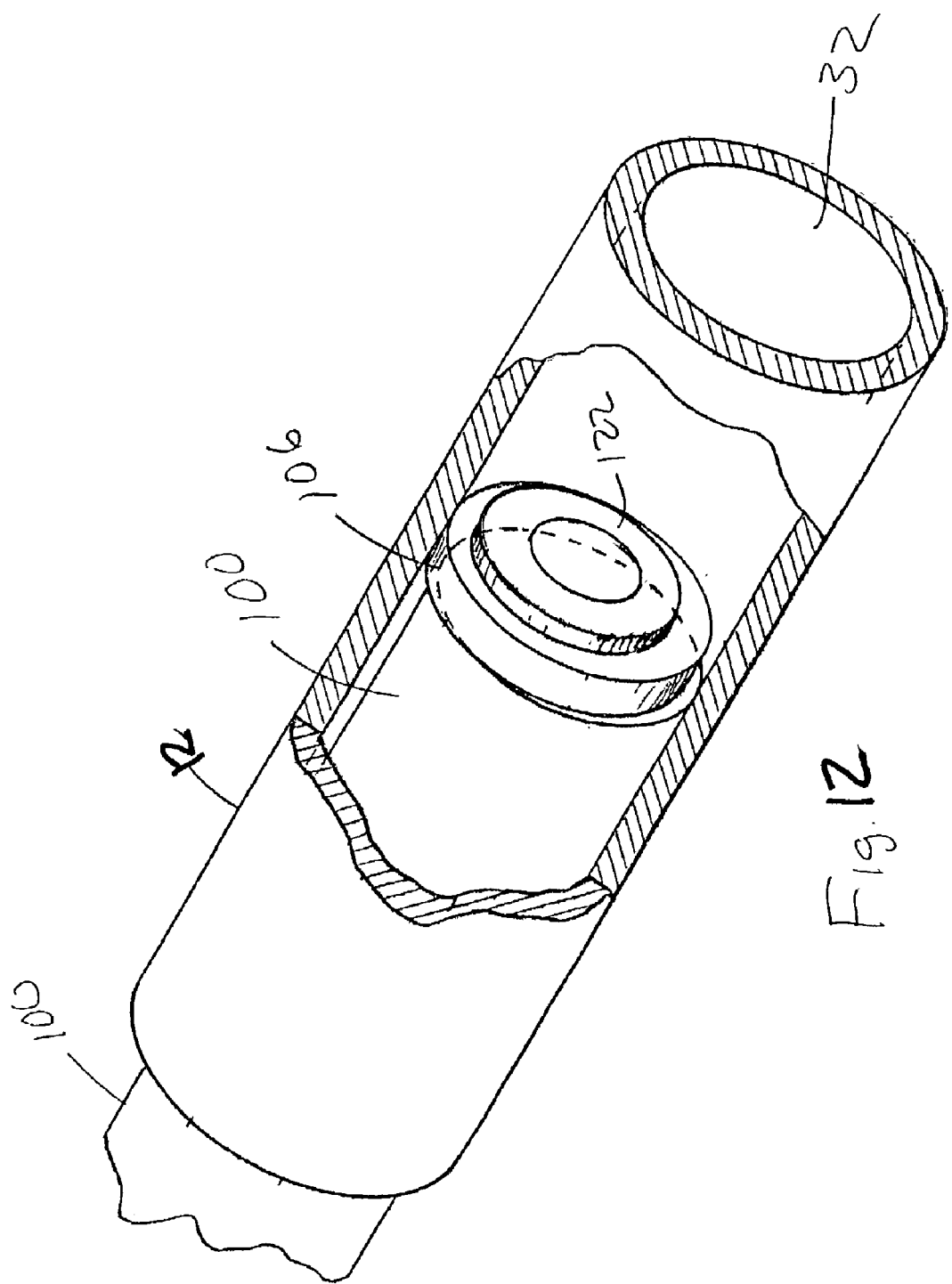
FIG. 12 is a perspective cut-a-way view of an actuator in a pole according to the present invention.

An actuator 18 is shown in FIG. 1 at the actuator end 20 of the telescopic pole 12 for rotating the camera 14 about the link 30. Two possible versions of the actuator 18 are shown in FIGS. 8–13, which can be used with the camera system 10. Both versions can be used with the actuator cable 92. FIGS. 8–12 show the first actuator 18, which includes a actuator shaft 100, clamping collar 102, axle 104 and cam 106. The actuator shaft 100 is sized to slide in and out of the hollow opening at the actuator end 20 of the telescopic pole 12. The actuator shaft 100 has a collar end 108 and a cam end 110. The actuator shaft 100 is hollow with openings at the collar and cam ends 108, 110 to allow the actuator cable 92 connected to the camera 14 to pass through the actuator shaft 100. The collar end 108 includes a slot 112 formed by removing the material of the actuator shaft 100 in order to form the slot 112. The slot 112 allows the collar end 108 to be squeezed to grip and hold the actuator cable 92 passing through the actuator shaft 100. The clamping collar 102 slips on the collar end 108 in the area of the slot 112. The clamping collar 102 includes a slot set screw 118 and slot set screw hole 116. When the slot set screw 118 is screwed into the clamping collar 102, the slot set screw 118 applies pressure against the actuator shaft 00, thereby squeezing the collar end 108 between the clamping collar 102 and the slot set screw 118. The openings at the ends 108, 110 of the actuator shaft 100 and the hollow passage in the actuator shaft 100 are offset from the center of the actuator shaft 100. The offset is for use of the cam 106, which allows the actuator 18 to be locked into position in the telescopic pole 12. The cam 106 is a round disc with an offset cam hole 18 which matches the offset of the opening at the cam end 108 of the actuator shaft 100. The axle 104 is a hollow shaft and includes an axle collar 122. The cam end 108 of the actuator shaft 100 includes a shaft set screw hole 124 and shaft set screw 126. The shaft set screw 126 is screwed into the hollow passage of the actuator shaft 100 via the shaft set screw hole 124. The axle 104 is inserted into the cam hole 118 and then inserted into the hollow passage at the cam end 108 of the actuator shaft 100. The shaft set screw 126 is tightened against the axle 104 to secure the axle 104 in the hollow passage of the actuator shaft 100. The axle 104 is positioned in actuator shaft 100 such that the cam 106 is allowed to rotate about the axle 104, yet is retained between the cam end 108 of the actuator shaft 100 and the axle collar 122. The outside diameter of the actuator shaft 100 and cam 106 are size slightly smaller than then the inside diameter of the telescopic pole 12. The difference in size between the two is usually in the range of 10 to 30 thousandths of an inch. When the actuator shaft 100 is inserted into the telescopic pole 12, the cam 106 and the actuator shaft 100 are aligned. The actuator 18 is locked in position in the telescopic pole 12 by twisting the actuator shaft 100 in the telescopic pole 12. When the actuator shaft 100 is twisted, the cam 106 remains in position due to frictional forces between the inside of the handle section 22 and the cam 106. The cam 106 remains in position because of the small variation in size between the inside diameter of telescopic pole 12 and the outside diameter of the cam 106. As the actuator shaft 100 is twisted and the cam 106 remains in position, the shaft-cam combination in effect jams in the telescopic pole 12, thereby locking the actuator 18 in position. The jam is effected due to the thicker portions of the cam 106 and actuator shaft 100 no longer being aligned and increasing the total diameter against the inside diameter of the telescopic pole 12, as shown in FIGS. 11–12. To unlock the actuator 18, simply twist the actuator 18 in the opposite direction that the actuator 18 was twisted to lock the actuator 18 in position.

Figure 13:
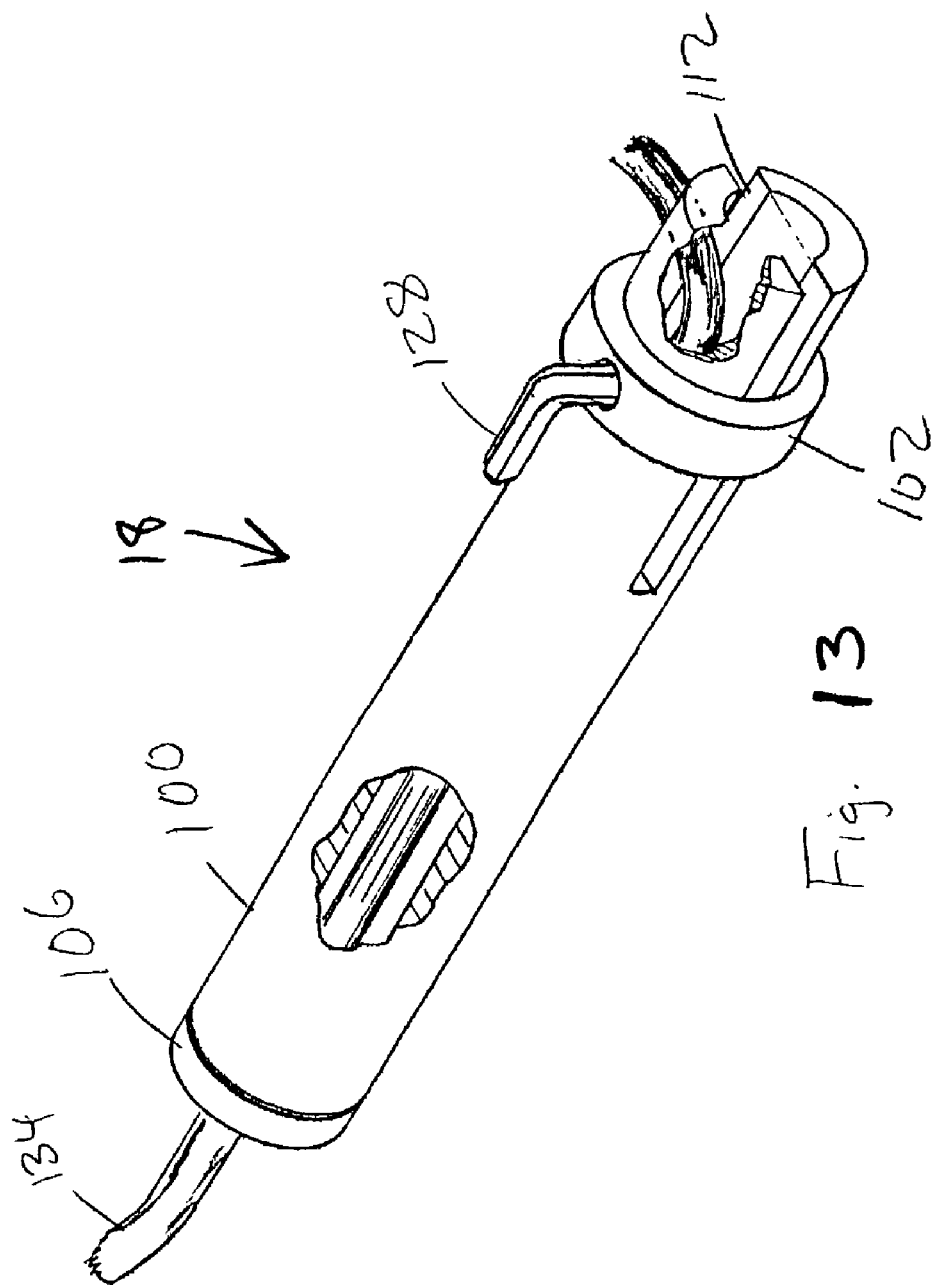
FIG. 13 is a perspective view of an another actuator according to the present invention.

FIG. 13 shows the second actuator 18 as a slightly different version of the first actuator 18 shown in FIGS. 8–12. The slot 112 in the second actuator 18 is larger near the collar end 108 of the actuator shaft 100. This allows the actuator cable 92 to be routed off to the side of the actuator shaft 100, rather than out the collar end 108 of the actuator shaft 100. The other difference is that the clamping collar 102 includes a set screw handle 128 attached to the slot set screw 118. The set screw handle 128 allows the user to adjust the tension of the collar end 108 gripping the actuator cable 92. Whereby, the set screw 118 attached to the handle 128 is unscrewed from the clamping collar 102 to release tension and screwed into the clamping collar 102 to increase tension. Releasing tension on the actuator cable 92 allows the wiring to be fed in and out of the hollow actuator shaft 100 during use of the actuator 18. The handle 128 can be as simple as a lever as shown or could be a knob.

The use of the camera system 10 and actuator 18 is as follows. The camera 14 is rotatably attached to the telescopic pole 12 and rest in an original straight on position, as shown in FIG. 1. The user adjusts the length of the telescopic pole 12 according to the configuration of the particular telescopic pole 12. The length of the actuator cable 92 inside the telescopic pole 12 is adjusted, as the telescopic pole 12 is adjusted, before applying compression to the actuator cable 92 at the actuator 18. The actuator 18 manipulates the camera 14 by rotating the camera 14 upward and rearward about the rotation axis of the link screws 54, as shown in FIGS. 14–15. The actuator cable 92 is used to operate and rotate the camera 14 by moving the actuator 18 which is griping the actuator cable 92. The actuator cable 92 runs into the actuator 18 and down the telescopic pole 12 to the harness connector 88. The actuator cable 92 is gripped and controlled by the clamping collar 102 of the actuator 18. The user pulls or releases the actuator 18 to operate movement of the camera 14. Pulling the actuator 18 pulls the clamped actuator cable 92, which pulls on the harness connector 88 and hence on the tendon cable 89. The tendon cable 89 pulls on the camera base 24 and rotates the camera 14 about the link 30 when the actuator cable 92 is pulled, as shown in FIGS. 14–15. When the camera 14 rotates from its original position, the camera base 24 pulls on the spring 28. When the actuator 18 is pulled, there is always tension from the spring 28 emanating from between the camera and pole bases 24, 22 when the camera base 24 rotates about the link 30. This tension pulls back on the camera base 24 and hence also the actuator cable 92 and actuator 18. As shown in FIG. 15, the link 30 and spring 28 allow the rotation of the camera 14, such that the camera 14 faces rearward back along the telescopic pole 12. Releasing the actuator 18 releases the tension on the spring 28, whereby the spring 28 pulls the camera 14 back to the camera's original position and pulls the actuator 18 back into the telescopic pole 12. The spring 28 must be long enough, so as the spring 28 is pulled along the pole base 22 by the camera base 24 during camera rotation by the tendon cable 89, the spring 28 is not pull out of the pole base 22. The slack in the wiring 32 of the wiring harness 87 prevents the wiring 32 from being disconnected from the camera 14 or harness connector 88 during rotation of the camera 14.

Figure 8:
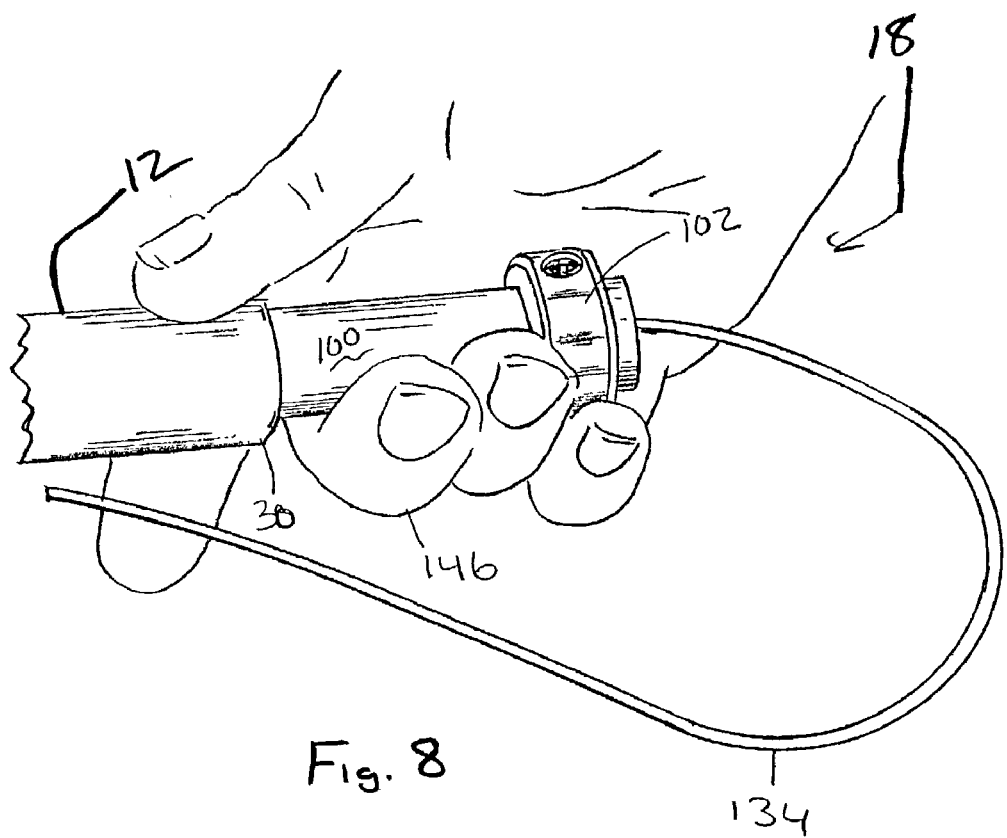
FIG. 8 is a perspective view of an actuator in a pole according to the present invention.
Figure 9:
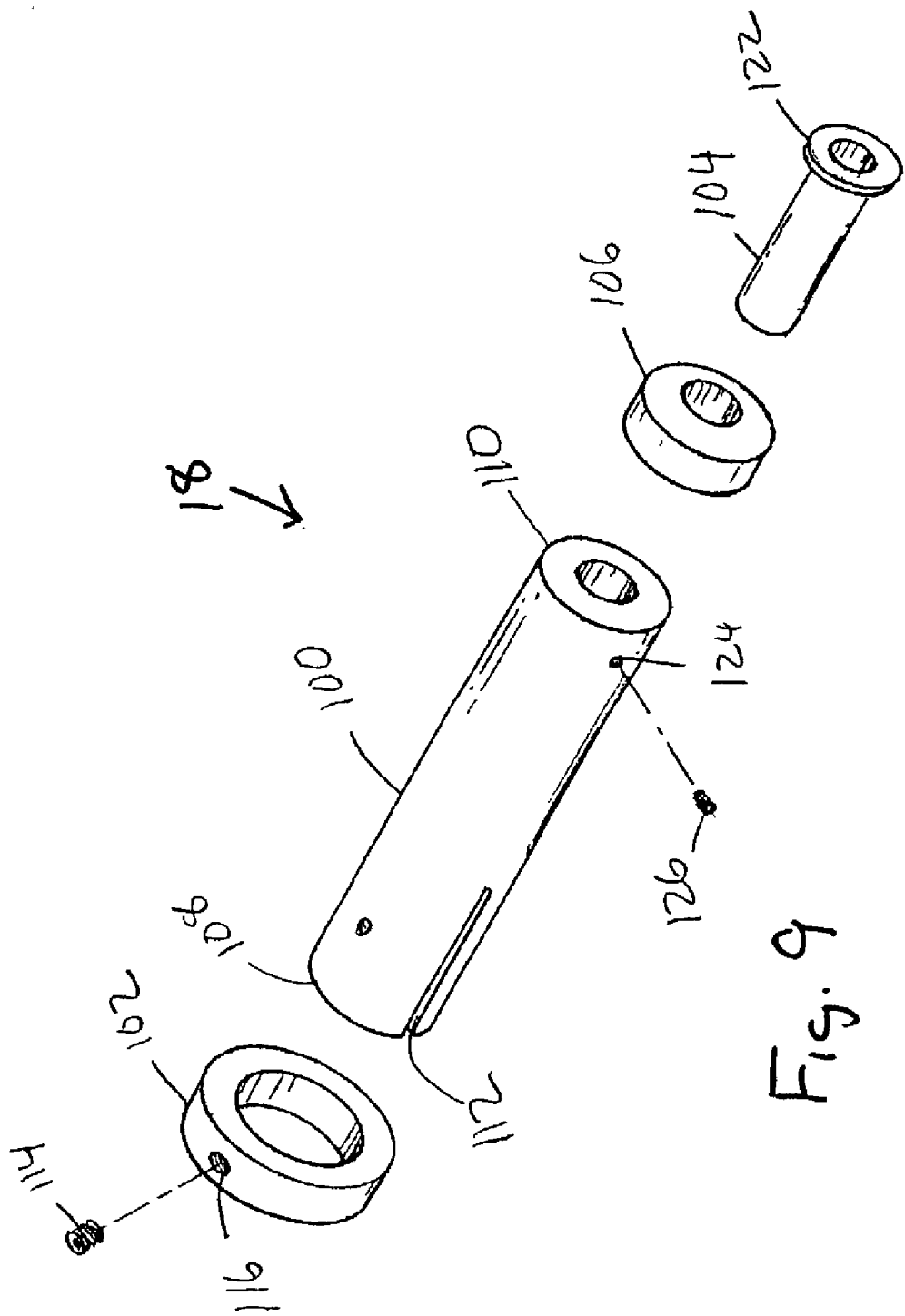
FIG. 9 is an exploded view of an actuator according to the present invention.
Figure 10:
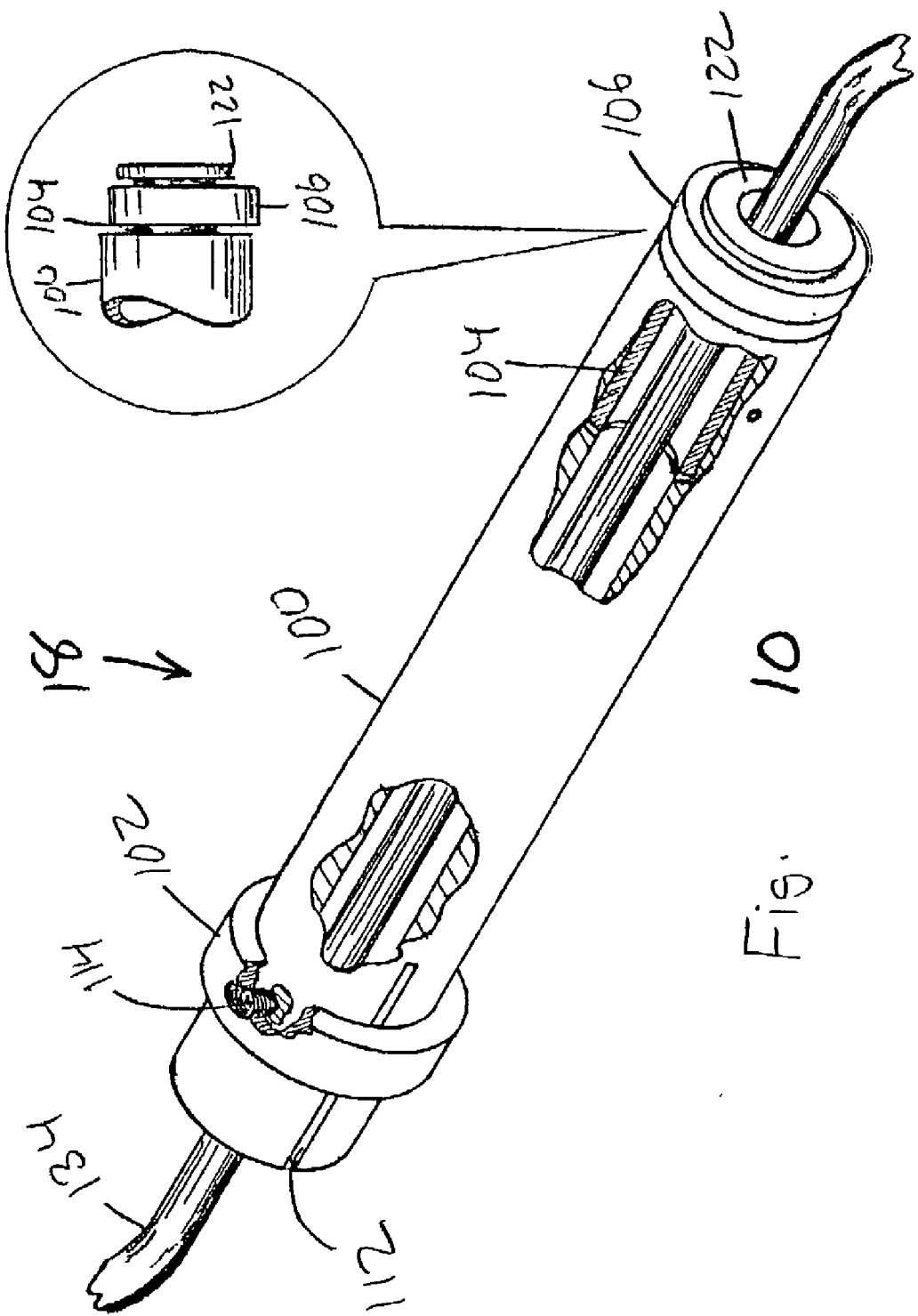
FIG. 10 is a perspective cut-a-way view of an actuator according to the present invention.

The user operates the actuator 18 by pulling back on the clamping collar 102, which in turn pulls the actuator cable 92 and rotates the camera 14 upward and rearward. There are two methods of holding the camera 14 in a fixed position along the path of rotation upward from the straight on position. The first method is to position the fingers 146 of the user between the actuator end 20 of the telescopic pole 12 and the collar 102, whereby the fingers 146 of the user prevent the actuator 18 from returning to a forward position. The first method is illustrated in FIG. 8. The second method is to twist the actuator 18 and invoke the cam 106 to lock the actuator shaft 100 in position inside the telescopic pole 12. The use of actuator 18 as described above allows the user to move and control the telescopic pole 12, while moving the actuator 18.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

The invention claimed is:

1. A camera system comprising:
    a pole, said pole having a camera end and an actuator end;
    a camera mount assembly mounted to said camera end of said pole for mounting of a camera; and
    an actuator mounted to said actuator end of said pole to move said camera;
    wherein said camera mount assembly comprises:
        a pole base mounted to said camera end of said pole;
        a camera base for mounting of said camera;
        a link connected between said pole base and said camera base to allow rotation of said camera base about said pole base;
        a tendon cable attached between said actuator and said camera base to pull on said camera base and rotate said camera base about said pole base;
        a spring inside said pole base and said camera base, said spring interconnecting said pole base and said camera base, said spring acting as a return, whereby said spring stretches when said tendon pulls on said camera base and recoils to pull said camera base back to an original position when said tendon cable is released from pulling on said camera base.

2. The camera system of claim 1, wherein said tendon cable is attached to a harness connector of a wiring harness; wherein wiring for said camera is part of an actuator cable connected between said actuator and said harness connector; wherein movement of said actuator pulls on said actuator cable which pulls on said harness connector, which in turn pulls said tendon cable; wherein said tendon cable and wiring harness are internal to said pole and pole base; and wherein said pole base and camera base both include a tendon slot which are aligned with each other to provide an area for said tendon cable to lie, so that said tendon cable does not catch on objects during movement of said pole.

3. The camera system of claim 2, wherein said pole base and camera base both include a link slot which are aligned with each other to provide an area for said link to lie, so that said link does not catch on objects during movement of said pole and wherein said link is rotatably connected between said pole and camera bases by two connection points, such that as said tendon cable pulls on said camera base, the camera base rotates about two rotational points at said connection points between said link and said pole and camera bases.

4. The camera system of claim 3, wherein said spring is a length that runs from inside said camera base, through said pole base and into part of said pole, such that as said spring stretches, said spring does not pull out of said pole base during rotation of said camera base.

5. The camera system of claim 4, wherein said pole is a telescopic pole, which can be reduced in size for transport.

6. The camera system of claim 4, where said link slots and said tendon slots are the same slots respectively on each of said pole and camera bases.

7. The camera system of claim 1, wherein said pole base and camera base both include a link slot which are aligned with each other to provide an area for said link to lie, so that said link does not catch on objects during movement of said pole and wherein said link is rotatably connected between said pole and camera bases by two connection points, such that as said tendon cable pulls on said camera base, the camera base rotates about two rotational points at said connection points between said link and said pole and camera bases.

8. The camera system of claim 1, wherein said spring is a length that runs from inside said camera base, through said pole base and into part of said pole, such that as said spring stretches, said spring does not pull out of said pole base during rotation of said camera base.

9. The camera system of claim 1, wherein said pole is a telescopic pole, which can be reduced in size for transport.

10. The camera system of claim 1, wherein said actuator is a shaft internal to actuator end of said pole and connected to said camera by an actuator cable to cause movement of said camera; and wherein said shaft includes a handle to allow said shaft to be push and pulled inside said pole to control movement of said camera.

11. The camera system of claim 10, wherein said shaft includes a collar end and a cam end; wherein said cam end is closest to said camera; wherein said cam end includes a cam rotatably attached to said cam end; wherein said cam has an outside diameter rotatably positioned offset from a center of an outside diameter of said pole; and wherein said outside diameter of said shaft and cam are size slightly smaller than an inside diameter of said pole such that by twisting said shaft in said pole, said cam remains in position due to frictional forces between said inside diameter of said pole and said cam and in effect jams said shaft in a locked position with said pole.

12. The camera system of claim 10, wherein said shaft is hollow to allow an actuator cable to pass; wherein said collar end includes a slot; and further including a fastener to squeeze said collar end together at said slot to hold said actuator cable in position.

13. The camera system of claim 12, further including an adjustment handle on said collar to allow quick release of pressure applied by said collar on said shaft.

14. The camera system of claim 10, further including a collar which is attached over said collar end to act as said handle and said fastener.

15. The camera system of claim 1, wherein said tendon cable is attached to a harness connector of a wiring harness; wherein wiring for said camera is part of an actuator cable connected between said actuator and said harness connector; wherein movement of said actuator pulls on said actuator cable which pulls on said harness connector, which in turn pulls said tendon cable; wherein said tendon cable and wiring harness are internal to said pole and pole base; and wherein said pole base and camera base both include a tendon slot which are aligned with each other to provide an area for said tendon cable to lie, so that said tendon cable does not catch on objects during movement of said pole; wherein said pole base and camera base both include a link slot which are aligned with each other to provide an area for said link to lie, so that said link does not catch on objects during movement of said pole; wherein said link is rotatably connected between said pole and camera bases by two connection points, such that as said tendon cable pulls on said camera base; wherein the camera base rotates about two rotational points at said connection points between said link and said pole and camera bases; wherein said spring is a length that runs from inside said camera base, through said pole base and into part of said pole, such that as said spring stretches, said spring does not pull out of said pole base during rotation of said camera base; wherein said actuator is a shaft internal to actuator end of said pole and connected to said camera by an actuator cable to cause movement of said camera; wherein said shaft includes a handle to allow said shaft to be push and pulled inside said pole to control movement of said camera; wherein said shaft includes a collar end and a cam end; wherein said cam end is closest to said camera; wherein said cam end includes a cam rotatably attached to said cam end; wherein said cam has an outside diameter rotatably positioned offset from a center of an outside diameter of said pole; wherein said outside diameter of said shaft and cam are size slightly smaller than an inside diameter of said pole such that by twisting said shaft in said pole, said cam remains in position due to frictional forces between said inside diameter of said pole and said cam and in effect jams said shaft in a locked position with said pole; wherein said shaft is hollow to allow said actuator cable to pass; wherein said collar end includes a slot; further including a fastener to squeeze said collar end together at said slot to hold said wiring cable in position; further including a collar which is attached over said collar end to act as said handle and said fastener; and further including an adjustment handle on said collar to allow quick release of pressure applied by said collar on said shaft.

16. The camera system of claim 15, wherein said pole is a telescopic pole, which can be reduced in size for transport.

17. The camera system of claim 15, where said link slots and said tendon slots are the same slots respectively on each of said pole and camera bases.

18. A camera system comprising:
a pole, said pole having a camera end and an actuator end;
a camera mount assembly mounted to said camera end of said pole for mounting of a camera; and
an actuator mounted to said actuator end of said pole to move said camera;
wherein said actuator is a shaft internal to actuator end of said pole and connected to said camera by an actuator cable to cause movement of said camera; and wherein said shaft includes a handle to allow said shaft to be push and pulled inside said pole to control movement of said camera.

19. The camera system of claim 18, wherein said shaft includes a collar end and a cam end; wherein said cam end is closest to said camera; wherein said cam end includes a cam rotatably attached to said cam end; wherein said cam has an outside diameter rotatably positioned offset from a center of an outside diameter of said pole; and wherein said outside diameter of said shaft and cam are size slightly smaller than an inside diameter of said pole such that by twisting said shaft in said pole, said cam remains in position due to frictional forces between said inside diameter of said pole and said cam and in effect jams said shaft in a locked position with said pole.

20. The camera system of claim 18, wherein said shaft is hollow to allow said actuator cable to pass; wherein said collar end includes a slot; and further including a fastener to squeeze said collar end together at said slot to hold said actuator cable in position.

21. The camera system of claim 20, further including an adjustment handle on said collar to allow quick release of pressure applied by said collar on said shaft.

22. The camera system of claim 18, further including a collar which is attached over said collar end to act as said handle and said fastener.

\* \* \* \* \*